(12) United States Patent
Zhang et al.

(10) Patent No.: US 9,986,683 B2
(45) Date of Patent: Jun. 5, 2018

(54) ELECTRIC MOWER

(71) Applicant: ZHEJIANG YAT ELECTRICAL APPLIANCE CO., LTD, Zhejiang (CN)

(72) Inventors: Jin Zhang, Zhejiang (CN); Jun Zhou, Zhejiang (CN)

(73) Assignee: ZHEJIANG YAT ELECTRICAL APPLIANCE CO., LTD, Zhejiang (CN)

( * ) Notice: Subject to any disclaimer, the term of this patent is extended or adjusted under 35 U.S.C. 154(b) by 0 days. days.

(21) Appl. No.: 15/387,550

(22) Filed: Dec. 21, 2016

(65) Prior Publication Data

US 2017/0099768 A1   Apr. 13, 2017

Related U.S. Application Data

(63) Continuation of application No. PCT/CN2015/084771, filed on Jul. 22, 2015.

(30) Foreign Application Priority Data

Jun. 11, 2015 (CN) .......................... 2015 1 0320250

(51) Int. Cl.
*A01D 34/78* (2006.01)
*A01D 34/58* (2006.01)
*A01D 34/68* (2006.01)
*A01D 34/69* (2006.01)
*A01D 34/71* (2006.01)
(Continued)

(52) U.S. Cl.
CPC ......... *A01D 34/6806* (2013.01); *A01D 34/69* (2013.01); *A01D 34/71* (2013.01); *A01D 34/78* (2013.01); *A01D 34/824* (2013.01); *A01D 2034/6843* (2013.01); *A01D 2101/00* (2013.01)

(58) Field of Classification Search
CPC ...... A01D 34/125; A01D 34/08; A01D 34/37; A01D 34/58; A01D 34/824; A01D 34/71; A01D 34/80; A01D 2034/6843; A01D 2101/00; A01D 34/6806; A01D 34/69; A01D 34/78
See application file for complete search history.

(56) References Cited

U.S. PATENT DOCUMENTS 7,728,534 B2 * 6/2010 Lucas .................. A01D 69/025
                                                        318/139
7,741,793 B2 * 6/2010 Lucas .................. A01D 69/025
                                                        318/139
(Continued)

FOREIGN PATENT DOCUMENTS

CN   201294749   8/2009
CN   101541578   9/2009
(Continued)

*Primary Examiner* — John Weiss
(74) *Attorney, Agent, or Firm* — JCIPRNET

(57) ABSTRACT

An electric mower includes a chassis; and a walking device, a mowing device, a power device, a handle device, and a back grass discharging device arranged on the chassis. The power device drives the operation of the walking device and the mowing device, the back grass discharging device discharges the grass cut by the mowing device, and the handle device controls the electric mower. The power device of the electric mower uses a hybrid power system formed by DC power supply and AC power supply.

6 Claims, 4 Drawing Sheets

(51) Int. Cl.
    *A01D 34/82*     (2006.01)
    *A01D 101/00*    (2006.01)

(56) References Cited

U.S. PATENT DOCUMENTS

| | | | | |
|---|---|---|---|---|
| 7,884,560 B2 * | 2/2011 | Lucas | .................... | A01D 34/78 |
| | | | | 318/139 |
| 8,336,282 B2 * | 12/2012 | Messina | ............... | A01D 34/008 |
| | | | | 56/320.1 |
| 9,538,699 B1 * | 1/2017 | Bejcek | ................. | A01D 34/006 |
| 2008/0120955 A1 | 5/2008 | Lucas et al. | | |
| 2014/0102064 A1 * | 4/2014 | Yamaoka | ............. | A01D 34/824 |
| | | | | 56/10.5 |
| 2014/0252996 A1 * | 9/2014 | Lucas | .................. | A01D 69/025 |
| | | | | 318/139 |
| 2015/0108728 A1 * | 4/2015 | Nie | ....................... | F16B 7/1418 |
| | | | | 280/47.371 |
| 2017/0149372 A1 * | 5/2017 | White | ................... | H02P 29/032 |

FOREIGN PATENT DOCUMENTS

| | | | |
|---|---|---|---|
| CN | 104798542 | 7/2015 | |
| CN | 204443099 | 7/2015 | |
| CN | 204539995 | 8/2015 | |
| CN | 204860135 | 12/2015 | |
| DE | 202015105464 U1 * | 11/2015 | ............. A01D 34/71 |
| EP | 2737787 A1 * | 6/2014 | ............. A01D 34/71 |
| GB | 2386813 A * | 10/2003 | ........... A01D 34/824 |

* cited by examiner

ELECTRIC MOWER

CROSS-REFERENCE TO RELATED APPLICATION

This application is a continuation of PCT application serial no. PCT/CN2015/084771, filed on Jul. 22, 2015, which claims priority to and the benefit of China Patent Application No. CN201510320250.8, filed on Jun. 11, 2015, the disclosure of which is incorporated herein by reference in its entirety.

TECHNICAL FIELD

The invention relates to a mower, and in particular, to an electric mower.

BACKGROUND

The current electric mower in the market has single power supply so that it cannot be adjusted flexibly and cannot satisfy the operation requirement of some users.

SUMMARY

The technical problem to be solved by the invention is to provide an electric mower so as to realize diversification of power supply and satisfy the using requirement of different customers.

To solve the above technical problem, the invention uses the following technical solution: an electric mower, comprising: a chassis; and a walking device, a mowing device, a power device, a handle device, and a back grass discharging device arranged on the chassis, wherein the power device drives the operation of the walking device and the mowing device, the back grass discharging device discharges the grass cut by the mowing device, and the handle device controls the electric mower, characterized in that the power device uses a hybrid power system formed by DC power supply and AC power supply.

Preferably, the DC power supply uses a battery pack, and the AC power supply supplies power to a motor by converting AC into DC.

Preferably, when the electric mower is powered on in the case of only inserting the battery pack, a drive control panel detects that the power supply comes from the battery pack and starts the motor, and when only being connected with AC, the drive control panel converts AC into DC whose voltage is equal to that of the battery pack, and then, DC starts the motor after passing through the drive control panel.

Preferably, the walking device comprises a universal wheel walking system and an irreversible walking system.

Preferably, the handle device comprises an upper handle and a lower handle, a handle adjusting mechanism is provided between the upper handle and the lower handle, the handle adjusting mechanism comprises a hinge pin and a compressed spring, a pin hole is provided on the lower handle, a gear hole is provided on the upper handle, and the hinge pin is inserted into the gear hole under the action of the compressed spring.

Preferably, the hinge pin is controlled by a button, a drive block is provided between the button and the hinge pin, a tapered wedge surface is provided on the drive block, and the button and the tapered wedge surface act to drive the disengagement of the hinge pin from the gear hole on the upper handle.

Preferably, an upper bushing is provided on the lower end of the upper handle, a lower bushing is provided on the upper end of the lower handle, the lower bushing is sheathed into the upper bushing, and the lower bushing bears against the upper bushing when the hinge pin reaches the highest gear.

Preferably, the back grass discharging device comprises a back cover plate provided on the back grass discharging outlet, the upper side of the back cover plate is hinged with an enclosure, and a back cover plate adjusting mechanism for adjusting the angle of the back cover plate is provided between the back cover plate and the enclosure.

Preferably, the back cover plate adjusting mechanism comprises an adjustment rod which has a stretchable rod structure.

Preferably, a storage chamber is provided on the back cover plate, and the adjustment rod is stored in the storage chamber after being shortened.

The power device of the mower in accordance with the invention uses a hybrid power system formed by DC power supply and AC power supply so as to realize diversification of power supply and satisfy the using requirement of different customers.

BRIEF DESCRIPTION OF THE DRAWINGS

The invention will be further described in combination with the accompanying drawings and the detailed description.

DETAILED DESCRIPTION

Figure 1:
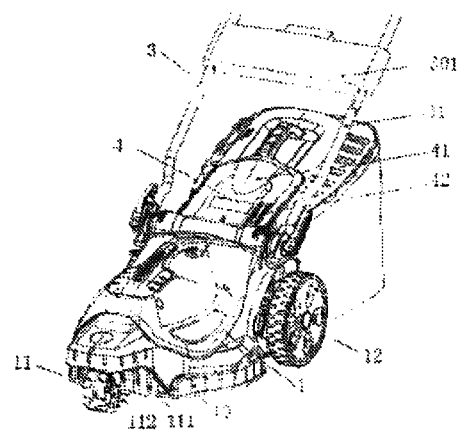
FIG. 1 shows a structural diagram of the electric mower in which a universal wheel walking system is provided in front of the chassis.

As shown in FIGS. 1 to 5, an electric mower comprises a body 1. The body comprises a chassis 10. A walking device, a mowing device, a power device 2, a handle device 3, and a back grass discharging device 4 are arranged on the chassis 10. The power device 2 drives the operation of the walking device and the mowing device, the back grass discharging device 4 discharges the grass cut by the mowing device, and the handle device 3 controls the electric mower.

Figure 2:
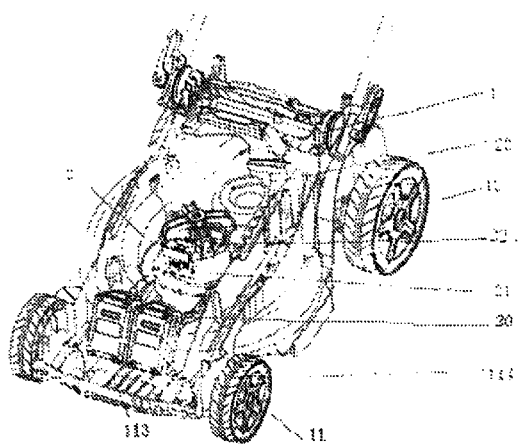
FIG. 2 shows a structural diagram of the electric mower in which an irreversible walking system is provided in front of the chassis.

As shown in FIG. 2, the power device uses a hybrid power system formed by DC power supply and AC power supply. A drive control panel 21 drives and controls the hybrid power. The DC power supply uses a battery pack 20, and the AC power supply comprises a transformer 23 and a rectifier. The transformer 23 and the rectifier supply power to a motor 22 by converting AC into DC whose voltage is equal to that of the battery pack 20.

When the electric mower is powered on in the case of only inserting the battery pack 20, the drive control panel 21 detects that the power supply comes from the battery pack 20 and starts the motor 22, and when only being connected with AC, the drive control panel 21 converts AC into DC whose voltage is equal to that of the battery pack 20, and then, DC starts the motor 22 after passing through the drive control panel 21.

As shown in FIGS. 1 and 2, the walking device comprises a front wheel assembly 11 and a back wheel assembly 12 provided on the chassis 10.

As shown in FIG. 1, the front wheel assembly 11 is a universal wheel walking system, comprising a three-wheel front bottom cover 111 and a universal wheel 112 mounted on the three-wheel front bottom cover. The three-wheel front bottom cover 111 is fixed on the chassis 10. The back wheel assembly is an irreversible walking system. The universal wheel walking system and the irreversible walking system form a system, which can flexibly change direction when being pushed.

As shown in FIG. 2, the front wheel assembly 11 is an irreversible walking system, comprising a four-wheel front bottom cover 113 and double wheels 114 mounted on the four-wheel front bottom cover. The four-wheel front bottom cover 113 is fixed on the chassis 10. This is the structure of a traditional mower, which can change direction inconveniently when being pushed. The back wheel assembly is a universal wheel walking system.

The front wheel assembly 11 formed by the four-wheel front bottom cover 113 and double wheels 114 and the front wheel assembly 11 formed by the three-wheel front bottom cover 111 and the universal wheel 112 can interchange their structures so as to be mounted on the chassis, and can realize fast interchange of both systems.

Figure 3:
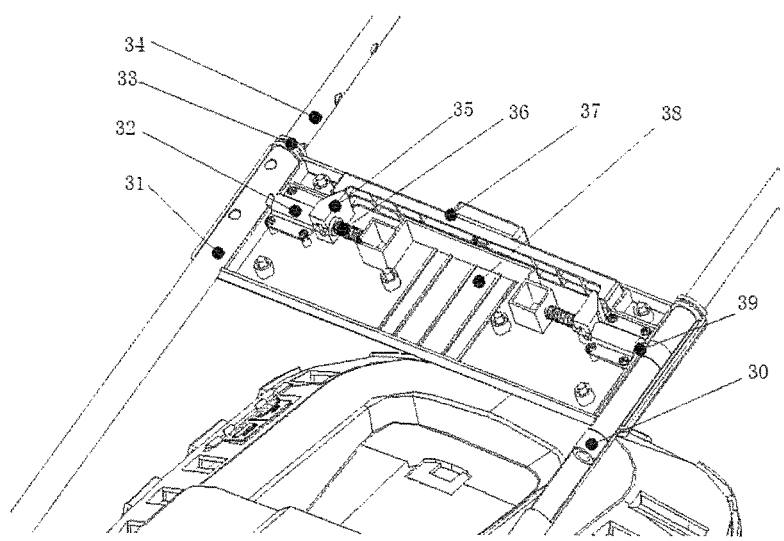
FIG. 3 shows a structural schematic diagram of the handle device.

As shown in FIG. 3, the handle device comprises an upper handle 34 and a lower handle 31. A handle adjusting mechanism is provided between the upper handle 34 and the lower handle 31. The handle adjusting mechanism comprises an adjusting panel 301 which is formed by an upper panel and a lower panel 38 (as shown in the figure, it is a structure in which the upper panel is removed). A hinge pin locating seat 32 is provided on the lower panel 38. A hinge pin 39 is provided on the hinge pin locating seat 32. A pin hole is provided on the lower handle 31. A gear hole is provided on the upper handle (a plurality of gear holes are provided on the upper handle, each of which corresponds to a gear height). The hinge pin 39 is inserted into the gear hole under the action of the compressed spring 36.

The hinge pin 39 is controlled by a button 37. A drive block 35 is provided between the button 37 and the hinge pin 39. A tapered wedge surface is provided on the drive block. The button 37 and the tapered wedge surface act to drive the disengagement of the hinge pin from the gear hole on the upper handle 34.

An upper bushing 33 is provided on the lower end of the upper handle. A lower bushing 30 is provided on the upper end of the lower handle. The lower bushing is sheathed into the upper bushing, and the lower bushing bears against the upper bushing when the hinge pin reaches the highest gear.

As shown in FIG. 3, the operator presses the button 37. Both end surfaces of the button 37 act on the tapered wedge surface of two drive blocks 35 so as to provide an axial force along the hinge pin 39 to the drive blocks 35 so that the two drive blocks 35 move towards the middle along the direction of the axis of the hinge pin 39 and compress the compressed spring 36. Furthermore, when the button 37 is pressed to the bottom, the hinge pin 39 is disengaged from the upper handle 34. Furthermore, after the hinge pin 39 is completely disengaged from the upper handle 34, the operator can pull up or press down the upper handle 34, and then loose the button 37. The button 37 resets under the action of the compressed spring 36. The hinge pin 39 bears against the upper handle 34 under the pressure of the compressed spring 36. The operator continues to pull up or press down the upper handle 34. After the hinge pin 39 corresponds to the respective gear hole, the compressed spring 36 bears against the hinge pin 39 quickly to insert the hinge pin into the gear hole of the upper handle 34, and the height gear to be adjusted has been reached.

Furthermore, when the hinge pin 39 reaches the position of the highest gear, the lower bushing 30 bears against the upper bushing 33 so as to prevent the separation of the upper and lower handles.

Figure 4:
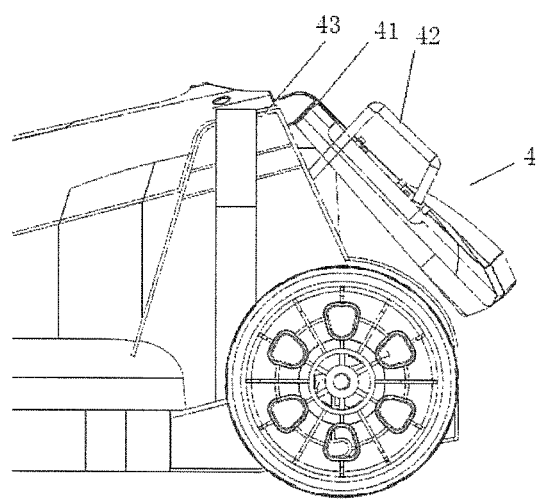
FIG. 4 shows a structural schematic diagram of the back cover plate in the maximally open state.
Figure 5:
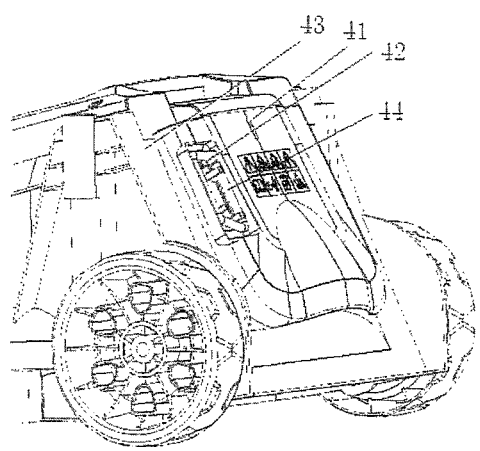
FIG. 5 shows a structural schematic diagram of the back cover plate in the minimum open state.

As shown in FIGS. 4 and 5, the back grass discharging device 4 comprises a back cover plate 41 provided on the back grass discharging outlet, the upper side of the back cover plate is hinged with an enclosure 43, and a back cover plate adjusting mechanism for adjusting the angle of the back cover plate 41 is provided between the back cover plate 41 and the enclosure 43.

Specifically, the back cover plate adjusting mechanism comprises an adjustment rod 42. The adjustment rod 42 has a stretchable rod structure similar to the draw bar of a draw-bar box, which can stretch freely. A storage chamber 44 is provided on the back cover plate 41, and the adjustment rod 42 is stored in the storage chamber 44 after being shortened.

As shown in FIG. 4, the adjustment rod 42 erects from the inner side of the back cover plate 41. One end of the adjustment rod 42 bears against the enclosure 43. A large included angle exists between the back cover plate 41 and the enclosure 43. At this point, the grass discharging amount is huge.

As shown in FIG. 5, when the adjustment rod 42 is folded inside the back cover plate 41, the back cover plate 41 can stick close to the enclosure 43. At this point, the grass discharging amount is very small.

The invention claimed is:

1. An electric mower, comprising: a chassis; and a walking device, a mowing device, a power device, a handle device, and a back grass discharging device arranged on the chassis, wherein the power device drives the operation of the walking device and the mowing device, the back grass discharging device discharges the grass cut by the mowing device, and the handle device controls the electric mower, wherein the power device uses a hybrid power system formed by DC power supply and AC power supply, wherein the handle device comprises an upper handle and a lower handle, a handle adjusting mechanism is provided between the upper handle and the lower handle, the handle adjusting mechanism comprises a hinge pin and a compressed spring, a pin hole is provided on the lower handle, a gear hole is provided on the upper handle, and the hinge pin is inserted into the gear hole under the action of the compressed spring, and wherein the hinge pin is controlled by a button, a drive block is provided between the button and the hinge pin, a tapered wedge surface is provided on the drive block, and the button and the tapered wedge surface act to drive the disengagement of the hinge pin from the gear hole on the upper handle.

2. The electric mower according to claim 1, wherein the DC power supply uses a battery pack, and the AC power supply supplies power to a motor by converting AC into DC.

3. The electric mower according to claim 2, wherein when the electric mower is powered on in the case of only inserting the battery pack, a drive control panel detects that the power supply comes from the battery pack and starts the motor, and when only being connected with AC, the drive control panel converts AC into DC whose voltage is equal to that of the battery pack, and then, DC starts the motor after passing through the drive control panel.

4. The electric mower according to claim 1, wherein the walking device comprises a universal wheel walking system and an irreversible walking system.

5. The electric mower according to claim 1, wherein an upper bushing is provided on the lower end of the upper handle, a lower bushing is provided on the upper end of the lower handle, the lower bushing is sheathed into the upper bushing.

6. The electric mower according to claim 1, wherein the back grass discharging device comprises a back cover plate provided on a back grass discharging outlet, the upper side of the back cover plate is hinged with an enclosure, and a back cover plate adjusting mechanism for adjusting the angle of the back cover plate is provided between the back cover plate and the enclosure.

\* \* \* \* \*